United States Patent
Kao

(10) Patent No.: US 7,284,643 B1
(45) Date of Patent: Oct. 23, 2007

(54) BRAKE DISK

(76) Inventor: Ching-Wen Kao, No. 1, Lane 276, Sec. 3, Jhongshan Rd., Changhua City, Changhua Hsien (TW)

( * ) Notice: Subject to any disclaimer, the term of this patent is extended or adjusted under 35 U.S.C. 154(b) by 0 days.

(21) Appl. No.: 11/494,504

(22) Filed: Jul. 28, 2006

(51) Int. Cl.
*F16D 65/12* (2006.01)

(52) U.S. Cl. .................................. 188/218 XL; 188/26

(58) Field of Classification Search ............... 188/189, 188/26, 218 XL
See application file for complete search history.

(56) References Cited

U.S. PATENT DOCUMENTS

| | | | | |
|---|---|---|---|---|
| 2,835,355 | A * | 5/1958 | Armstrong | 188/218 XL |
| 3,403,758 | A * | 10/1968 | Stout | 188/218 R |
| 6,308,808 | B1 * | 10/2001 | Krenkel et al. | 188/218 XL |
| 7,066,556 | B2 * | 6/2006 | Irie | 301/6.9 |
| 2004/0040802 | A1 * | 3/2004 | Veneziano et al. | 188/218 XL |
| 2004/0200674 | A1 * | 10/2004 | Campbell | 188/26 |
| 2004/0200678 | A1 * | 10/2004 | Lin | 188/218 XL |
| 2005/0056495 | A1 * | 3/2005 | Greppi | 188/26 |
| 2005/0161296 | A1 * | 7/2005 | Okabe | 188/218 XL |
| 2005/0252739 | A1 * | 11/2005 | Callahan et al. | 188/218 XL |
| 2006/0175160 | A1 * | 8/2006 | Weiss | 188/218 XL |

FOREIGN PATENT DOCUMENTS

JP          61130634       *  6/1986

* cited by examiner

*Primary Examiner*—Devon Kramer
(74) *Attorney, Agent, or Firm*—Rabin & Berdo, P.C.

(57) ABSTRACT

A brake disk has a disk body. The disk body has two sides, an outer periphery, a central hole, multiple through holes and multiple curved grooves. The central hole is defined through the disk body. The through holes are defined through the disk body around the central hole. The curved grooves are defined respectively in the sides of the disk body and each groove has a first end extending to the outer periphery of the disk body and a second end extending to and communicating with one of the through holes.

5 Claims, 3 Drawing Sheets

BRAKE DISK

BACKGROUND OF THE INVENTION

1. Field of the Invention

The present invention relates to a brake disk, and more particularly to a brake disk for a vehicle and having heat and dust dissipating effects.

2. Description of Related Art

A brake disk assembly provides an excellent braking effect and is widely used in vehicles, such as a car, motorcycle or bicycle. A conventional brake disk assembly substantially comprises a brake disk and a braking device. The brake disk is securely attached to a wheel hub of a vehicle, and the braking device is mounted on a frame of the vehicle and has two brake pads located respectively at two sides of the brake disk. When a brake lever or a brake pedal is pull or pushed, the brake pads are driven to squeeze the brake disk to provide a braking effect to the vehicle.

The conventional brake disk is a round disk and comprises multiple through holes to provide a heat-dissipating effect and reduce the consumption of material, but the area for dissipating heat on the brake disk is small so the heat-dissipating effect of the conventional brake disk is not enough. Especially, when a vehicle is slowed down or stopped from a high speed, the temperature of the brake disk is highly increased due to the huge friction between the brake disk and the brake pads. If the heat on the brake disk cannot be efficiently dissipated, the braking effect of the brake disk assembly will be reduced.

Furthermore, the clamping force between the brake disk and the brake pads will be reduced if dust or water is stacked on the brake disk, but the dust or water staked on the conventional brake disk cannot be effectively cleared.

To overcome the shortcomings, the present invention tends to provide a brake disk to mitigate or obviate the aforementioned problems.

SUMMARY OF THE INVENTION

The main objective of the invention is to provide a brake disk for a vehicle and having excellent heat and dust dissipating effects. The brake disk has a disk body. The disk body has two sides, an outer periphery, a central hole, multiple through holes and multiple curved grooves. The central hole is defined through the disk body. The through holes are defined through the disk body around the central hole. The curved grooves are defined respectively in the sides of the disk body and each groove has a first end extending to the outer periphery of the disk body and a second end extending to and communicating with one of the through holes.

Other objects, advantages and novel features of the invention will become more apparent from the following detailed description when taken in conjunction with the accompanying drawings.

DETAILED DESCRIPTION OF PREFERRED EMBODIMENT

Figure 1:
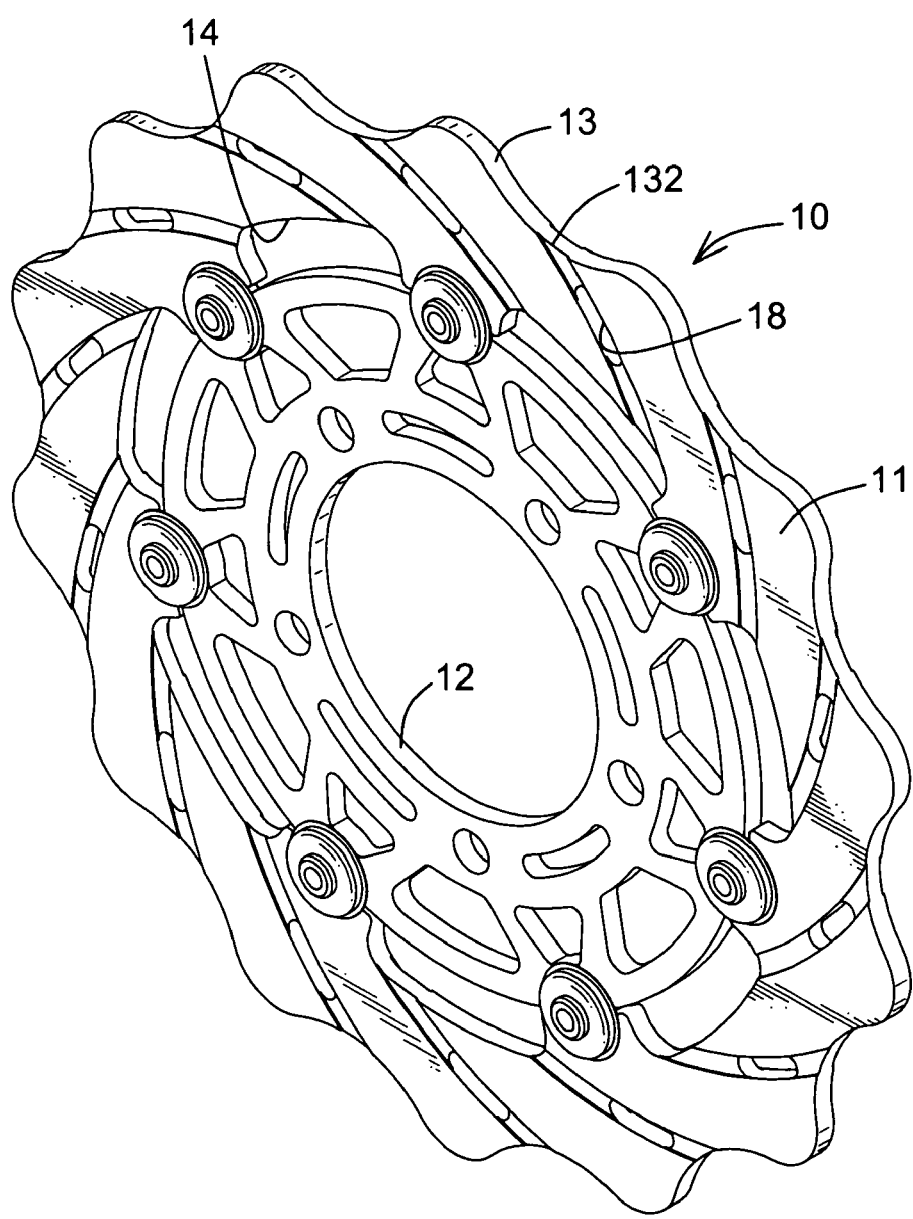
FIG. 1 is a perspective view of a brake disk in accordance with the present invention.
Figure 2:
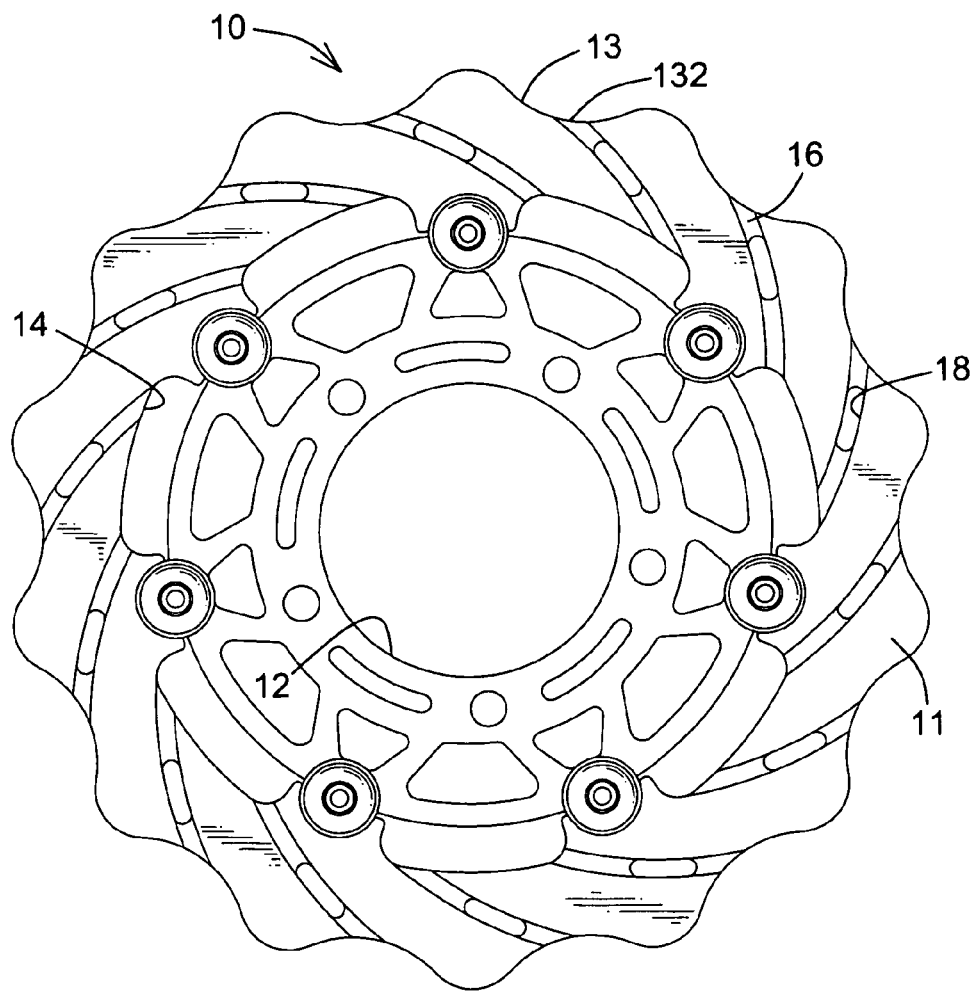
FIG. 2 is a side plane view of the brake disk in FIG. 1.
Figure 3:
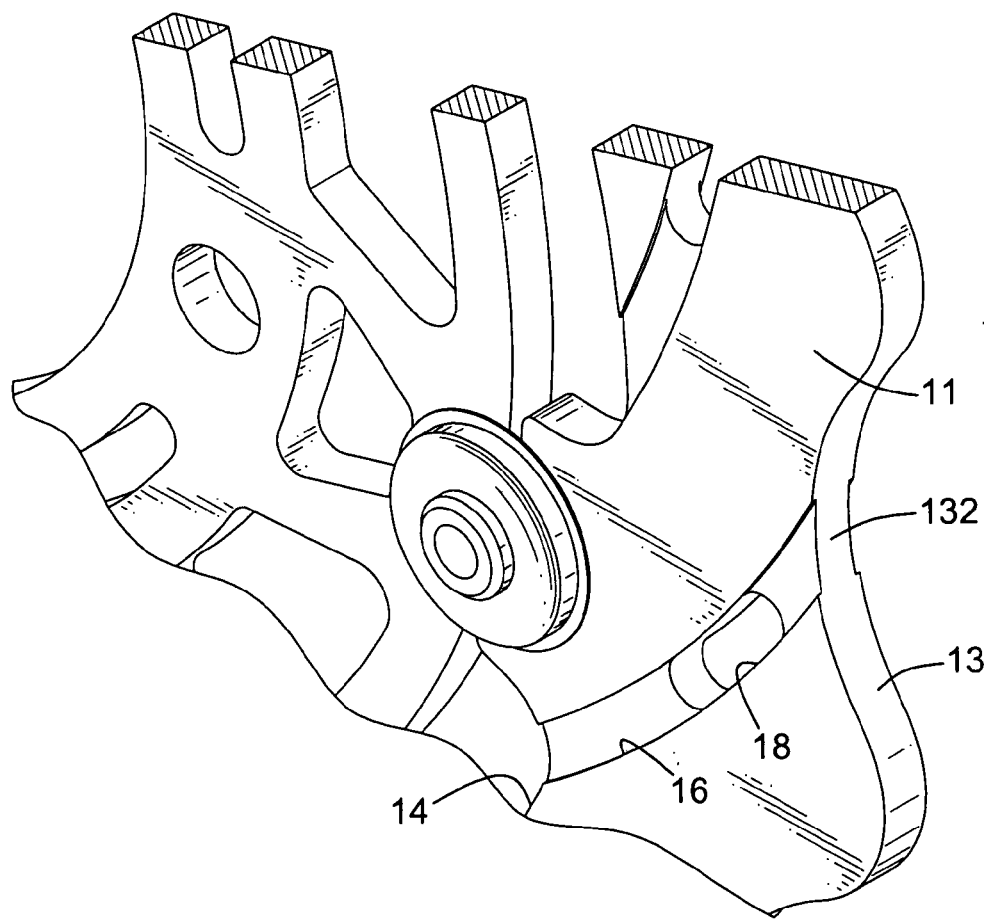
FIG. 3 is an enlarged perspective view in partial section of the brake disk in FIG. 1.

With reference to FIGS. 1 to 3, a brake disk (10) for a vehicle in accordance with the present invention comprises a disk body (11). The disk body (11) is round and has two sides, an outer periphery, a central hole (12), multiple through holes (14) and multiple curved grooves (16). The outer periphery of the disk body (11) is waveshaped and has multiple depressions (13). Each depression (13) has a lowermost segment (132). The central hole (12) is defined through the disk body (11) and is securely mounted on a wheel hub of a vehicle.

The through holes (14) are defined through the disk body (11) around the central hole (12). In a preferred embodiment, the through holes (14) are collectively arranged to be concentric to the central hole (12).

The curved grooves (16) are defined respectively in the sides of the disk body (11). Each curved groove (16) has a first end extending to the outer periphery of the disk body (11) and a second end extending to and communicating with one of the through holes (14). In a preferred embodiment, the first end of each groove (16) extends to the lowermost segment (132) of a corresponding depression (13). Each curved groove (16) has a bottom and an elongated hole (18) defined through the bottom and the disk body (11). In addition, each curved groove (16) on one side of the disk body (11) overlaps with one of the grooves (16) on the other side of the disk body (11), and the elongated holes (18) in the overlapped curved grooves (16) are also overlapped with each other.

With the arrangement of the curved grooves (16), the area for dissipating heat on the disk body (11) is increased so that the heat-dissipating efficiency of the brake disk (10) is improved. In addition, the curved grooves (16) and elongated holes (18) implement multiple flow channels in the disk body (11) and allow circumfluous cool air to pass over the flow channels. Consequently, the brake disk (10) can be efficiently cooled down from a high speed, and the heat-dissipating effect of the brake disk (10) is further improved.

Furthermore, when brake pads in a braking device squeeze respectively with the sides of the disk body (11), dust or water stacked on the disk body (11) will be swept into the curved grooves (16) and the elongated holes (18) and dissipated from the outer periphery and the through holes (14) of the disk body (11) via the curved grooves (16) and the elongated holes (18). Because the first ends of the curved grooves (16) extend to the lowermost segments (132) of the depressions (13) in the outer periphery, the travel of dissipating the dust or water in the curved grooves (16) will be reduced and the dust or water can be efficiently dissipated from the disk body (11). Accordingly, the braking effect of the brake disk (10) is improved.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A brake disk comprising:

a disk body having two sides; an outer periphery;

a central hole defined through the disk body;

multiple through holes defined through the disk body around the central hole; and multiple curved grooves defined respectively in the sides of the disk body, each groove having a first end extending to the outer periphery of the disk body and a second end extending to and communicating with one of the through holes, each groove further having a bottom and an elongated hole defined through the bottom and the disk body.

2. The brake disk as claimed in claim 1, wherein the outer periphery of the disk body is waveshaped and has multiple depressions.

3. The brake disk as claimed in claim 2, wherein each depression has a lowermost segment; and the first end of each groove extends to the lowermost segment of one of the depressions.

4. The brake disk as claimed in claim 3, wherein the through holes are arranged to be collectively concentric to the central hole.

5. The brake disk as claimed in claim 1, wherein the through holes are arranged to be collectively concentric to the central hole.

* * * * *